US008487535B2

(12) United States Patent
Tani et al.

(10) Patent No.: US 8,487,535 B2
(45) Date of Patent: Jul. 16, 2013

(54) AUTOMOTIVE HEADLAMP APPARATUS CONTROLLING LIGHT DISTRIBUTION PATTERN

(75) Inventors: Kentaro Tani, Shizuoka (JP); Noriko Sato, Shizuoka (JP); Motohiro Komatsu, Shizuoka (JP); Hidetada Tanaka, Shizuoka (JP); Hiroyuki Ishida, Shizuoka (JP); Naoki Uchida, Shizuoka (JP); Takuya Kotajima, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 331 days.

(21) Appl. No.: 12/836,469

(22) Filed: Jul. 14, 2010

(65) Prior Publication Data
US 2011/0012510 A1 Jan. 20, 2011

(30) Foreign Application Priority Data
Jul. 15, 2009 (JP) .................................. 2009-167178

(51) Int. Cl.
*B60Q 1/04* (2006.01)
(52) U.S. Cl.
USPC .......................................................... 315/82
(58) Field of Classification Search
USPC ................................ 315/76–82; 362/507–519
See application file for complete search history.

(56) References Cited

U.S. PATENT DOCUMENTS

| 4,985,816 | A | 1/1991 | Seko et al. |
| 6,144,158 | A * | 11/2000 | Beam ............................... 315/82 |
| 7,824,086 | B2 * | 11/2010 | Yamamura et al. ............ 362/519 |
| 2007/0183164 | A1* | 8/2007 | Naganawa et al. ............ 362/507 |
| 2008/0239746 | A1* | 10/2008 | Wuller et al. .................. 362/538 |

FOREIGN PATENT DOCUMENTS

| DE | 10 2005 041 234 A1 | 3/2007 |
| EP | 2 085 264 A2 | 8/2009 |
| JP | 2008-037240 | 2/2008 |
| JP | 2008-0114800 | 5/2008 |
| JP | 2009-046118 | 3/2009 |

OTHER PUBLICATIONS

European Office Action, Aug. 2, 2012, 4 pages.

* cited by examiner

*Primary Examiner* — Douglas W Owens
*Assistant Examiner* — Amy Yang
(74) *Attorney, Agent, or Firm* — Fulwider Patton LLP

(57) ABSTRACT

An automotive headlamp apparatus comprises: a lamp unit configured to be capable of forming an additional light distribution pattern that includes an upper area above the cut-off line of a light distribution pattern for low beam and that is divided into a plurality of individual patterns; and a controller configured to control formation of each of the individual patterns in accordance with presence of a forward vehicle. The controller reduces the illuminance of an individual pattern overlapping an area where a forward vehicle is present and increases the illuminance of at least one of other individual patterns.

11 Claims, 10 Drawing Sheets

AUTOMOTIVE HEADLAMP APPARATUS CONTROLLING LIGHT DISTRIBUTION PATTERN

CROSS-REFERENCE TO RELATED APPLICATION

This application is based upon and claims the benefit of priority from the prior Japanese Patent Application No. 2009-167178, filed on Jul. 15, 2009, the entire content of which is incorporated herein by reference.

BACKGROUND OF THE INVENTION

1. Field of the Invention

The present invention relates to an automotive headlamp apparatus, and in particular, to an automotive headlamp apparatus used in an automobile, etc.

2. Description of the Related Art

An automotive headlamp apparatus can generally switch low beam and high beam to each other. The low beam illuminates a near distance with a predetermined illuminance so as not to provide glare to forward vehicles including oncoming vehicles and leading vehicles, and is used mainly when driving in an urban area. On the other hand, the high beam illuminates a forward wide area and a remote distance with a relatively high illuminance, and is used mainly when driving at high speed on a road on which forward vehicles are few.

Although the high beam is excellent in the visibility by a driver in comparison with the low beam, there is the problem of providing glare to the drivers of other vehicles. Accordingly, when driving, in particular, in an urban area at night, there are many cases where the low beam is used. When using the low beam, a light source for the high beam is not used. On the other hand, there is always the demand that the visibility of roads by a driver should be enhanced when using the low beam.

In response to the demand, Japanese Patent Application Publication NO. 2008-37240 discloses a technique in which a plurality of high beam units for individually emitting light toward each of high beam emitting areas, which are divided into multiple areas, are provided, and when an object to which emission of light is prohibited (hereinafter, referred to as an "emission-prohibited object") has been detected, the high beam unit that emits light to the light emitting area where an emission-prohibited object is present is turned off. According to the technique, emission of high beam toward an emission-prohibited object can be suppressed while ensuring distant visibility with high beam.

In the aforementioned situations, the present inventor has recognized the following problem. That is, when the aforementioned emission-prohibited object is an oncoming vehicle, there is the possibility that the oncoming vehicle may be turning on a headlamp. When the headlamp of an oncoming vehicle is being turned on, there is the possibility that the light emitted therefrom may be scattered within driver's eyeballs, thereby causing a threshold value for the luminance contrast to be large, that is, a luminance difference necessary for distinguishing an object to be sighted from the background to be large. As a result, there is the possibility that an effect of enhancing the visibility of a driver, obtained by emitting light toward the area where an emission-prohibited object is not present, may be suppressed.

SUMMARY OF THE INVENTION

The present invention has been made based on such a recognition by the present inventor, and one of the purposes of the invention is to provide a technique in which, when controlling emission of light in accordance with presence of a forward vehicle, the visibility of a driver in an area where a forward vehicle is not present can be further enhanced.

In order to solve the aforementioned problem, an automotive headlamp apparatus according to an embodiment of the present invention comprises: a lamp unit configured to be capable of forming an additional light distribution pattern that includes an upper area above the cut-off line of a light distribution pattern for low beam and that is divided into a plurality of individual patterns; and a controller configured to control formation of each of the individual patterns in accordance with presence of a forward vehicle, in which the controller reduces the illuminance of an individual pattern overlapping an area where a forward vehicle is present and increases the illuminance of at least one of other individual patterns.

BRIEF DESCRIPTION OF THE DRAWINGS

Embodiments will now be described, by way of example only, with reference to the accompanying drawings, which are meant to be exemplary, not limiting, and wherein like elements are numbered alike in several figures, in which.

DETAILED DESCRIPTION OF THE INVENTION

Figure 1:
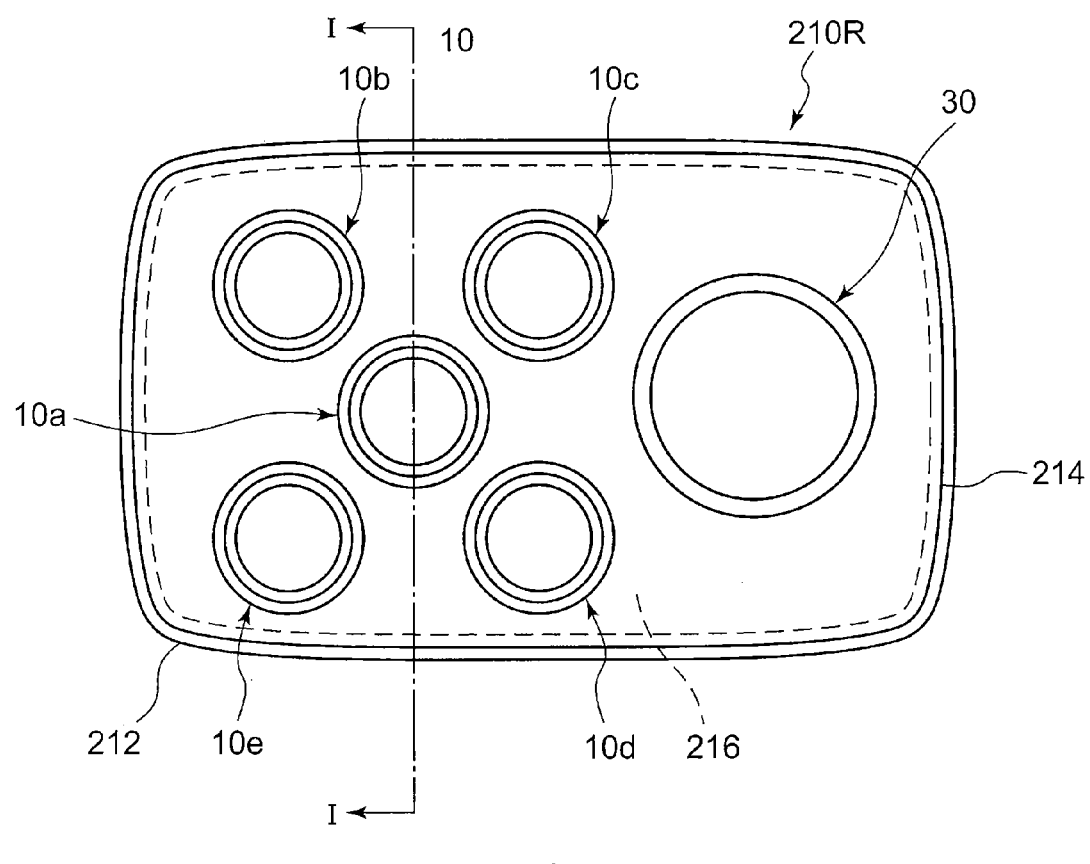
FIG. 1 is a schematic front view of an automotive headlamp apparatus according to Embodiment 1.

The invention will now be described by reference to the preferred embodiments. This does not intend to limit the scope of the present invention, but to exemplify the invention.

Hereinafter, the present invention will be described with reference to the drawings based on the preferred embodiments of the invention. The same or like components, members, or processes illustrated in each drawing are denoted by like reference numerals, and the duplicative descriptions will be appropriately omitted. The embodiments are not intended to limit the invention but to serve as particular examples thereof, and all features or combinations thereof described there are not always essential to the present invention.

(Embodiment 1)

FIG. 1 is a schematic front view of an automotive headlamp apparatus according to Embodiment 1. An automotive headlamp apparatus 200 according to the present embodiment is a light distribution variable headlamp whose headlamp unit is singly arranged on each side of the vehicle width direction. The headlamp units arranged on both sides have the structures substantially the same to each other, other than that both structures are symmetrical to each other. Accordingly, in the following descriptions, the structure of the headlamp unit 210R, arranged on the right side, will be described and descriptions with respect to the headlamp unit on the left side will be appropriately omitted. It is noted that, when each component of the headlamp unit on the left side is described, for convenience of explanation, each component will be denoted with the same reference numeral as that of the corresponding component of the headlamp unit 210R.

The headlamp unit 210R has a lamp chamber 216 formed by a lamp body 212 having an opening on the vehicle front side and a translucent cover 214 covering the opening. In the lamp chamber 216, lamp units 10a, 10b, 10c, 10d, and 10e and a lamp unit 30, all of which emit light in the vehicle front direction, are housed. In the following descriptions, the lamp units 10a to 10e are collectively referred to as a "lamp unit 10".

Figure 2:
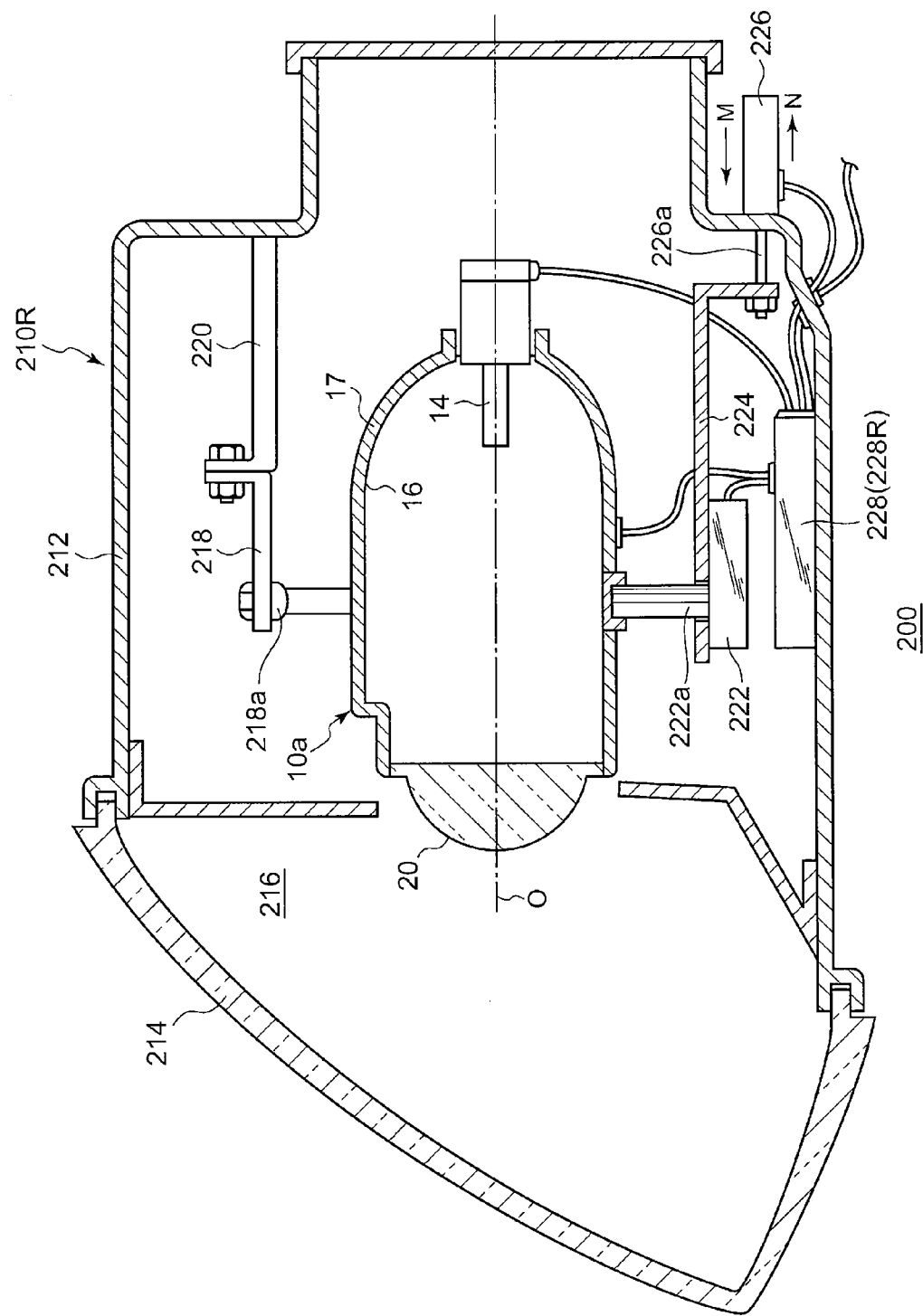
FIG. 2 is a schematic vertical cross-sectional view illustrating the internal structure of the automotive headlamp apparatus.

FIG. 2 is a schematic vertical cross-sectional view illustrating the internal structure of the automotive headlamp apparatus. FIG. 2 illustrates the cross section taken along line I-I in FIG. 1. On part of the lamp unit 10a housed in the lamp chamber 216, a lamp bracket 218 having a pivot mechanism 218a is formed, the pivot mechanism 218a being to be the center of the swing in the right and left or up and down direction of the lamp unit 10a. The lamp bracket 218 is connected with a body bracket 220, fixed to the inner wall surface of the lamp body 212, by fastening members, such as screws. Accordingly, the lamp unit 10a is fixed to a predetermined position in the lamp chamber 216, and the posture of the lamp unit 10a can also be changed to, for example, forward leaning posture or backward leaning posture, etc., centered on the pivot mechanism 218a.

The rotational axis 222a of a swivel actuator 222 for structuring an Adaptive Front-lighting System (AFS) for curved roads, which illuminates the traveling direction when driving on a curved road, etc., is fixed to the underside of the lamp unit 10a. The swivel actuator 222 swivels the lamp unit 10a in the traveling direction, centered on the pivot mechanism 218a, based on the data on a steering amount, which is provided from the vehicle side, on the shape data of the driving road, which is provided from a navigation system, and on the relationship of the relative position between a forward vehicle, including an oncoming vehicle and a leading vehicle, and the driver's vehicle, etc. As a result, the emission range of the lamp unit 10a is oriented to the front of a curve of a curved road, not to the front of the vehicle, thereby enhancing the forward visibility of a driver. The swivel actuator 222 can be composed of, for example, a stepping motor. Alternatively, when a swivel angle is fixed, a solenoid, etc., can be used.

The swivel actuator 222 is fixed to a unit bracket 224. A leveling actuator 226 arranged outside the lamp body 212 is connected with the unit bracket 224. The leveling actuator 226 is composed of, for example, a motor that elongates and contracts a rod 226a in the direction of the arrows M and N. When the rod 226a has been elongated in the direction of the arrow M, the lamp unit 10a swings so as to take backward leaning posture, centered on the pivot mechanism 218a. In contrast, when the rod 226a has been contracted in the direction of the arrow N, the lamp unit 10a swings so as to take forward leaning posture, centered on the pivot mechanism 218a. When the lamp unit 10a takes backward leaning posture, the leveling adjustment for turning the light axis of the lamp unit 10a upwards can be performed. In contrast, when the lamp unit 10a takes forward leaning posture, the leveling adjustment for turning the light axis thereof downwards can be performed. The light axis thereof can be adjusted in accordance with the vehicle posture by performing the leveling adjustment as stated above. As a result, the reaching distance of the light emitted forward by the automotive headlamp apparatus 200 can be adjusted to the optimal distance.

This leveling adjustment can also be performed in accordance with the vehicle posture while driving. For example, a vehicle takes backward leaning posture when accelerated while driving, in contrast, a vehicle takes forward leaning posture when decelerated while driving. Accordingly, the emitting direction of the automotive headlamp apparatus 200 also fluctuates up and down, corresponding to a posture state of a vehicle, thereby causing the forward emission distance to be larger or smaller. Accordingly, the reaching distance of the forward emission can be adjusted, even while driving, to the optimal one by performing the leveling adjustment of the lamp unit 10a in real time based on the vehicle posture. This is sometimes referred to as "auto leveling".

An emission controller 228 performing control of turning on/off the lamp unit 10a, etc., is arranged on the inner wall surface of the lamp chamber 216 at a lower position of the lamp unit 10a. In FIG. 1, an emission controller 228R for controlling the headlamp unit 210R is arranged. The emission controller 228R also performs control of the swivel actuator 222 and the leveling actuator 226, etc.

The lamp unit 10a can be provided with an aiming adjustment mechanism. For example, an aiming pivot mechanism (not illustrated), which is to be the center of the swing when the aiming adjustment is performed, is arranged, for example, in the connection portion between the rod 226a of the leveling actuator 226 and the unit bracket 224. A pair of aiming adjustment screws (not illustrated), which move forward/backward in the vehicle longitudinal direction, are arranged in the connection portion between the body bracket 220 and the lamp bracket 218 so as to create a gap between the aiming adjustment screws in the vehicle width direction. For example, when the two aiming adjustment screws are moved forward, the lamp unit 10a takes forward leaning posture, centered on the aiming pivot mechanism, thereby the light axis being adjusted downward. Likewise, when the two aiming adjustment screws are moved backward, the lamp unit 10a takes backward leaning posture, centered on the aiming pivot mechanism, thereby the light axis being adjusted upward. Further, when the aiming adjustment screw on the left side in the vehicle width direction is moved forward, the lamp unit 10a takes clockwise swivel posture, centered on the aiming pivot mechanism, thereby the light axis being adjusted rightward. Further, when the aiming adjustment screw on the right side in the vehicle width direction is moved forward, the lamp unit 10a takes counter-clockwise swivel posture, centered on the aiming pivot mechanism, thereby the light axis being adjusted leftward. This aiming adjustment is performed when a vehicle is shipped or inspected, or when the automotive headlamp apparatus 200 is replaced with another. At the time, the automotive headlamp apparatus 200 is adjusted so as to have the prescribed posture specified in terms of design and the control of forming a light distribution pattern according to the present embodiment is performed on the basis of this posture.

The lamp unit 10a has a bulb 14 as a light source, a lamp housing 17 supporting a reflector 16 on the inner wall, and a projection lens 20. As the bulb 14, for example, an incandescent lamp, a halogen lamp, an electric discharge bulb, or an LED can be used. In the present embodiment, an example is described in which the bulb 14 is composed of a halogen lamp. The reflector 16 reflects the light emitted from the bulb 14. The light emitted from the bulb 14 and the light reflected by the reflector 16 are guided to the projection lens 20. At least part of the reflector 16 is elliptical sphere-shaped, and the elliptical sphere is designed such that the cross-sectional shape including the light axis O of the lamp unit 10*a* becomes at least part of the elliptical shape. The elliptical sphere-shaped portion of the reflector 16 has the first focal point at the approximate center of the bulb 14 and the second focal point on the back focal plane of the projection lens 20.

The projection lens 20 is arranged on the light axis O extending in the vehicle longitudinal direction, and the bulb 14 is arranged on the back side of the back focal plane, which is a focal plane including the back focal point of the projection lens 20. The projection lens 20 is composed of a plano-convex aspheric lens, the front surface of which is convex-shaped and the back surface of which is flat-shaped, and the projection lens 20 projects, as an inverted image, the image of the light source that is formed on the back focal plane onto the virtual vertical screen in front of the automotive headlamp apparatus 200. The structure of the lamp unit 10*a* is not particularly limited to this, but may be a reflective lamp unit not having the projection lens 20.

The lamp units 10*b* to 10*e* have the same structures as that of the lamp unit 10*a*, and each of which is provided with a swivel actuator and a leveling actuator. The lamp unit 30 is one capable of forming a light distribution pattern for low beam, which will be described later, and comprises a bulb, a housing that supports a reflector on the inner wall, and a projection lens, in the same way as the lamp unit 10. The lamp unit 30 is provided with a conventionally known shade mechanism between the bulb and the projection lens, and a light distribution pattern for low beam is formed with part of the light emitted from the bulb being shielded by the shade mechanism. The lamp unit 30 is also provided with a swivel actuator and a leveling actuator. Control of turning on/off the lamp units 10*b* to 10*e* and the lamp unit 30 and control of the swivel actuator and the leveling actuator with which each lamp unit is provided, are performed by the emission controller 228. The emission controller 228 can individually perform control of the lamp units 10*a* to 10*e* and the lamp unit 30.

Figure 3:
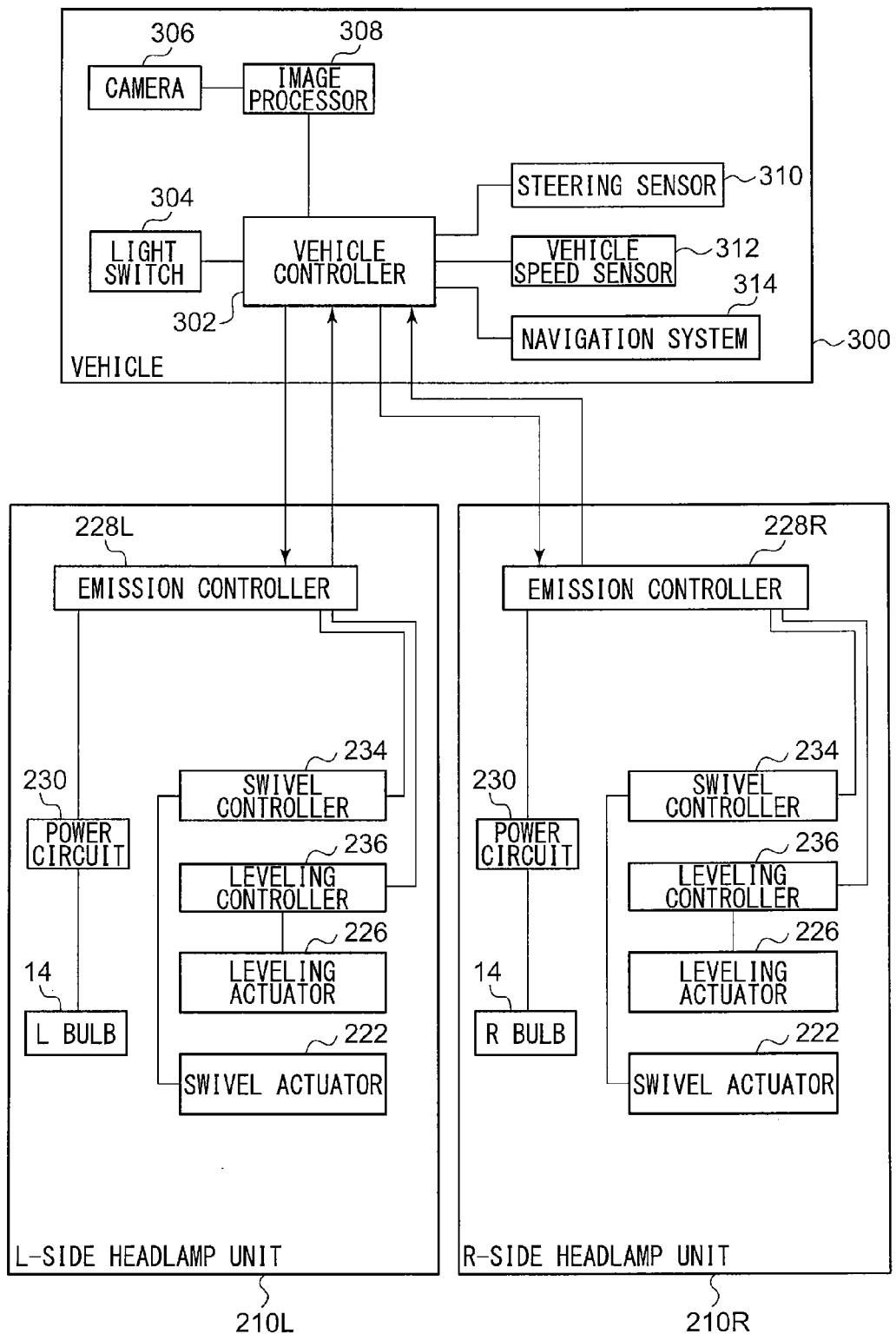
FIG. 3 is a functional block view illustrating operative cooperation between an emission controller in a headlamp unit and a vehicle controller on the vehicle side.

FIG. 3 is a functional block view illustrating operative cooperation between an emission controller in a headlamp unit structured as stated above and a vehicle controller on the vehicle side. As stated above, the structures of the headlamp unit 210R on the right side and that 210L on the left side are basically the same to each other, and hence only the headlamp unit 210R will be described and the description with respect to the headlamp unit 210L will be omitted.

The emission controller 228R in the headlamp unit 210R performs control of a power circuit 230 based on the information obtained from a vehicle controller 302 mounted in a vehicle 300, and thereby performs control of turning on the bulb 14 in the lamp units 10 and 30. Also, the emission controller 228R controls a swivel controller 234 and a leveling controller 236 based on the information obtained from the vehicle controller 302. The swivel controller 234 adjusts the light axes of the lamp units 10 and 30 with respect to the vehicle width direction by controlling the swivel actuator 222. For example, the swivel controller 234 turns the light axes of the lamp units 10 and 30 toward the direction where the vehicle will travel, while swiveling, such as driving on a curved road and driving left or right. The leveling controller 236 adjusts the light axes of the lamp units 10 and 30 with respect to the vehicle vertical direction by controlling the leveling actuator 226. For example, the leveling controller 236 adjusts the reaching distance of the forward-emitted light to an optimal distance by adjusting the postures of the lamp units 10 and 30 in accordance with the backward leaning posture or the forward leaning posture of a vehicle occurring when the vehicle is accelerated or decelerated. The vehicle controller 302 provides the same information also to the headlamp unit 210L to make an emission controller 228L provided in the headlamp unit 210L perform the same control as the emission controller 228R.

In the present embodiment, the light distribution patterns formed by the headlamp units 210L and 210R can be switched to each other in accordance with an operation content of a light switch 304 by a driver. In this case, the emission controllers 228L and 228R determine a light distribution pattern by controlling turning on/off of the lamp units 10 and 30 in accordance with an operation of the light switch 304.

The headlamp units 210L and 210R according to the present embodiment may perform automatic control so as to form a light distribution pattern optimal for the state of a vehicle 300 or the situations around the vehicle by detecting the situations therearound with various sensors, not in accordance with an operation of the light switch 304. For example, when it can be detected that a leading vehicle, an oncoming vehicle, or a pedestrian, etc., is present in front of the driver's vehicle, the emission controllers 228L and 228R determine that glare should be prevented based on the information obtained from the vehicle controller 302, and then form a light distribution pattern for low beam. In contrast, when it can be detected that a leading vehicle, an oncoming vehicle, or a pedestrian, etc., is not present in front of the driver's vehicle, the emission controllers 228L and 228R determine that the visibility of a driver should be enhanced, and then form a light distribution pattern for high beam. Alternatively, the emission controllers 228L and 228R may form an optimal light distribution pattern in view of a forward vehicle in accordance with an existence state of a forward vehicle, by individually controlling turning on/off of each lamp unit 10, in addition to a light distribution pattern for low beam and that for high beam. Such a control mode is sometimes referred to as an "ADB (Adaptive Driving Beam) mode".

In order to detect a target object, such as a leading vehicle and an oncoming vehicle, etc., as stated above, for example, a camera 306, such as a stereo camera, etc., is connected with the vehicle controller 302 as a means of recognizing a target object. Image frame data photographed by the camera 306 is subjected to predetermined image processing, such as recognition processing of a target object, by an image processor 308 such that a recognition result of the image processing is provided to the vehicle controller 302. For example, when the data that includes a feature point indicating a vehicle, the feature point preliminarily being held by the vehicle controller 302, is present in the recognition result data provided from the image processor 308, the vehicle controller 302 recognizes existence of a vehicle and then provides the information to the emission controllers 228L and 228R. After receiving the information on a vehicle from the vehicle controller 302, the emission controllers 228L and 228R form an optimal light distribution pattern in view of the vehicle. Herein, the "feature point indicating a vehicle" means a light spot with a predetermined light intensity or more, appearing in an estimated existence area of a marker lamp, for example, such as a headlamp or a tail lamp, etc., of a forward vehicle. In addition, when the data that includes a feature point indicating a pedestrian, the feature point preliminarily being held by the vehicle controller 302, is present in the recognition result data provided from the image processor 308, the vehicle controller 302 provides the information to the emission controllers 228L and 228R. Thereafter, the emission controllers 228L and 228R form an optimal light distribution pattern in view of the pedestrian.

Further, the vehicle controller 302 can also obtain information from a steering sensor 310 or a vehicle speed sensor 312, etc., which are usually mounted in the vehicle 300. With such information, the emission controllers 228L and 228R can select a light distribution pattern to be formed in accordance with a driving state or a driving posture of the vehicle 300, or can change light distribution patterns in a simplified manner by changing the direction of the light axis. For example, when the vehicle controller 302 determines that a vehicle is swiveling based on the information from the steering sensor 310, the emission controllers 228L and 228R, which have received the information from the vehicle controller 302, enhance the visibility by turning the light axes of the lamp units 10 and 30 to the swiveling direction with the swivel actuator 222 being controlled through the swivel controller 234. Such a control mode is sometimes referred to as a "swivel response mode.

When driving at high speed at night, it is desirable to illuminate the front of the driver's vehicle such that an oncoming vehicle approaching from a distance, a leading vehicle, a traffic sign, or a message board is recognized as soon as possible. Accordingly, when the vehicle controller 302 determines that a vehicle is driving at high speed based on the information from the vehicle speed sensor 312, the emission controllers 228L and 228R may change the lamp units 10 and 30 so as to take backward leaning postures by controlling the leveling actuator 226 through the leveling controller 236. Such a control mode is sometimes referred to as a speed response mode.

Further, the vehicle controller 302 can also obtain information from a non-illustrated inter-vehicle distance sensor mounted in the vehicle 300, and the emission controllers 228L and 228R can adjust the height of the cutoff line of a light distribution pattern in accordance with the distance between a forward vehicle and the driver's vehicle (inter-vehicle distance). For example, when the vehicle controller 302 determines that a forward vehicle is relatively far away based on the information from the inter-vehicle distance sensor, the emission controllers 228L and 228R change the lamp unit 30 so as to take backward leaning posture by controlling the leveling actuator 226 through the leveling controller 236. Thereby, the emission controllers 228L and 228R can enhance the visibility of a driver while preventing glare to a forward vehicle, by slightly raising the cut-off line of a light distribution pattern for low beam. The light distribution pattern formed by such a control is sometimes referred to as a dynamic cut-off line.

The light axis of the lamp unit 10 can also be adjusted without the use of the swivel actuator 222 or the leveling actuator 226. For example, the visibility in a desired direction may be enhanced by performing the aiming control in real time to make the lamp units 10 and 30 swivel or take forward leaning postures or backward leaning postures.

Besides that, the vehicle controller 302 can also obtain information on the shape or form of a road, and that on the installation of a road sign, etc., from a navigation system 314. By obtaining these information beforehand, the emission controllers 228L and 228R can also smoothly form a light distribution pattern suitable for a driving road with the leveling actuator 226 and the swivel actuator 222, etc., being controlled. Such a control mode is sometimes referred to as a navi response mode. The automatic formation control of a light distribution pattern including the aforementioned various control modes is performed when automatic formation control is ordered by, for example, the light switch 304.

Figure 4:
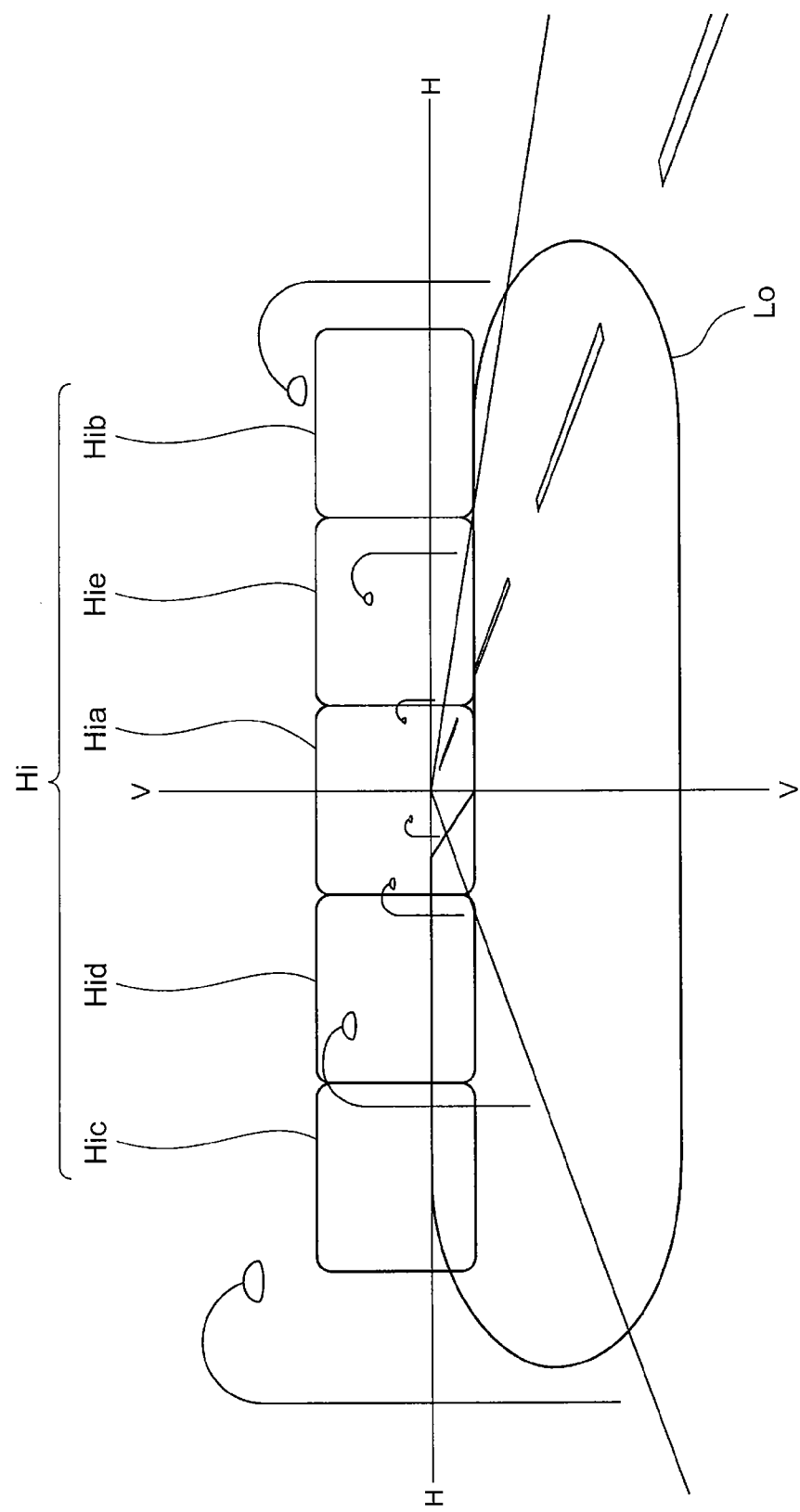
FIG. 4 is a view illustrating a shape of a light distribution pattern.

Subsequently, light distribution patterns that each of the headlamp units 210L and 210R in the automotive headlamp apparatus 200 can form, will be described. FIG. 4 is a view illustrating a shape of a light distribution pattern. FIG. 4 illustrates a light distribution pattern that has been formed on a virtual vertical screen arranged at a predetermined position in front of a lamp, for example, at a 25 m-distant position in front of a lamp. As stated above, the headlamp units 210L and 210R have the structures substantially the same to each other, and hence the two headlamp units can form the same light distribution patterns.

The headlamp units 210L and 210R can form a light distribution pattern for low beam Lo by the light emitted from the lamp unit 30. The light distribution pattern for low beam Lo illustrated in FIG. 4 is a light distribution pattern, taking into consideration of not providing glare to a forward vehicle or a pedestrian when keeping to the left. The light distribution pattern for low beam Lo has each of: an opposite lane side cut-off line extending in parallel with the line H-H that is a horizontal line, the opposite lane side cut-off line being present on the right side of the line V-V passing through the upper end of the light distribution pattern for low beam Lo; a driver's lane side cut-off line extending at a higher position than the opposite lane side cut-off line and extending in parallel with the line H-H, the driver's lane side cut-off line being present on the left side of the line V-V; and a diagonal cut-off line connecting the opposite lane side cut-off line and the driver's lane side cut-off line with each other, the diagonal cut-off line being present between the two cut-off lines. The diagonal cut-off line extends diagonally left upwards from the intersection point between the opposite lane side cut-off line and the line V-V at a tilt angle of 45°.

The headlamp units 210L and 210R can form a light distribution pattern for high-beam Hi by the light emitted from the lamp unit 10. The light distribution pattern for high-beam Hi corresponds to an additional light distribution pattern including the upper area above the cut-off line of the light distribution pattern for low beam Lo, and is formed additionally to the light distribution pattern for low beam Lo. The light distribution pattern for high-beam Hi is used for illuminating a forward wide range and a remote distance, and is formed, for example, when it is not necessary to take into consideration glare to a forward vehicle or a pedestrian. Specifically, the light distribution pattern is formed when there is not any forward vehicle or any pedestrian or when a forward vehicle, etc., is present far away to the extent that, even if a light distribution pattern for high beam Hi is formed, glare is not provided thereto.

The light distribution pattern for high-beam Hi is divided into individual patterns Hia to Hie, each of which is approximately rectangular-shaped and arranged in a horizontal line, the individual patterns Hia to Hie being formed by the respective lamp units 10a to 10e. The individual patterns Hia, Hib, Hic, Hid, and Hie are formed by the lamp units 10a, 10b, 10c, 10d, and 10e, respectively. The emission controllers 228L and 228R can independently increase/reduce the illuminance of each of the individual patterns Hia to Hie. The illuminance of each of the individual patterns Hia to Hie can be increased/reduced by changing the magnitude of the electrical power outputted to the bulb 14 from the power circuit 230. Herein, the aforementioned "reduce/reduced" includes the case where the illuminance is reduced to the extent not to provide glare to a forward vehicle while the light distribution pattern is being formed, and the case where the illuminance of the light distribution pattern is made 0, that is, the light is turned off. The aforementioned "the extent not to provide glare to a forward vehicle" can be set based on experiments or simulations by a designer.

The headlamp units 210L and 210R can form various types of specially-additional light distribution patterns by combining the light distribution pattern for low beam Lo and the individual patterns Hia to Hie. For example, the headlamp units 210L and 210R can form a light distribution pattern for left high beam by which a so-called "left high beam" is formed, by combining the light distribution pattern for low beam Lo and the individual patterns Hic and Hid. This light distribution pattern for left high beam is one in which the opposite lane side of the light distribution pattern for high beam Hi is shielded and only the driver's lane side thereof is emitted with a high beam range, when keeping to the left. Further, the two headlamp units can form a light distribution pattern for right high beam by which a so-called "right high beam" is formed, by combining the light distribution pattern for low beam Lo and the individual patterns Hie and Hib. This light distribution pattern for right high beam is one in which the driver's lane side of the light distribution pattern for high beam Hi is shielded and only the opposite lane side thereof is emitted with a high beam range, when keeping to the left. Further, by forming, with the headlamp unit 210L, one of the light distribution pattern for left high beam and that for right high beam and by forming the other one with the headlamp unit 210R, a so-called split light distribution pattern can be formed. The split light distribution pattern is one in which a shielded area is formed in the central portion above the horizontal line and high beam areas are formed on both horizontal sides of the shielded area.

Figure 5:
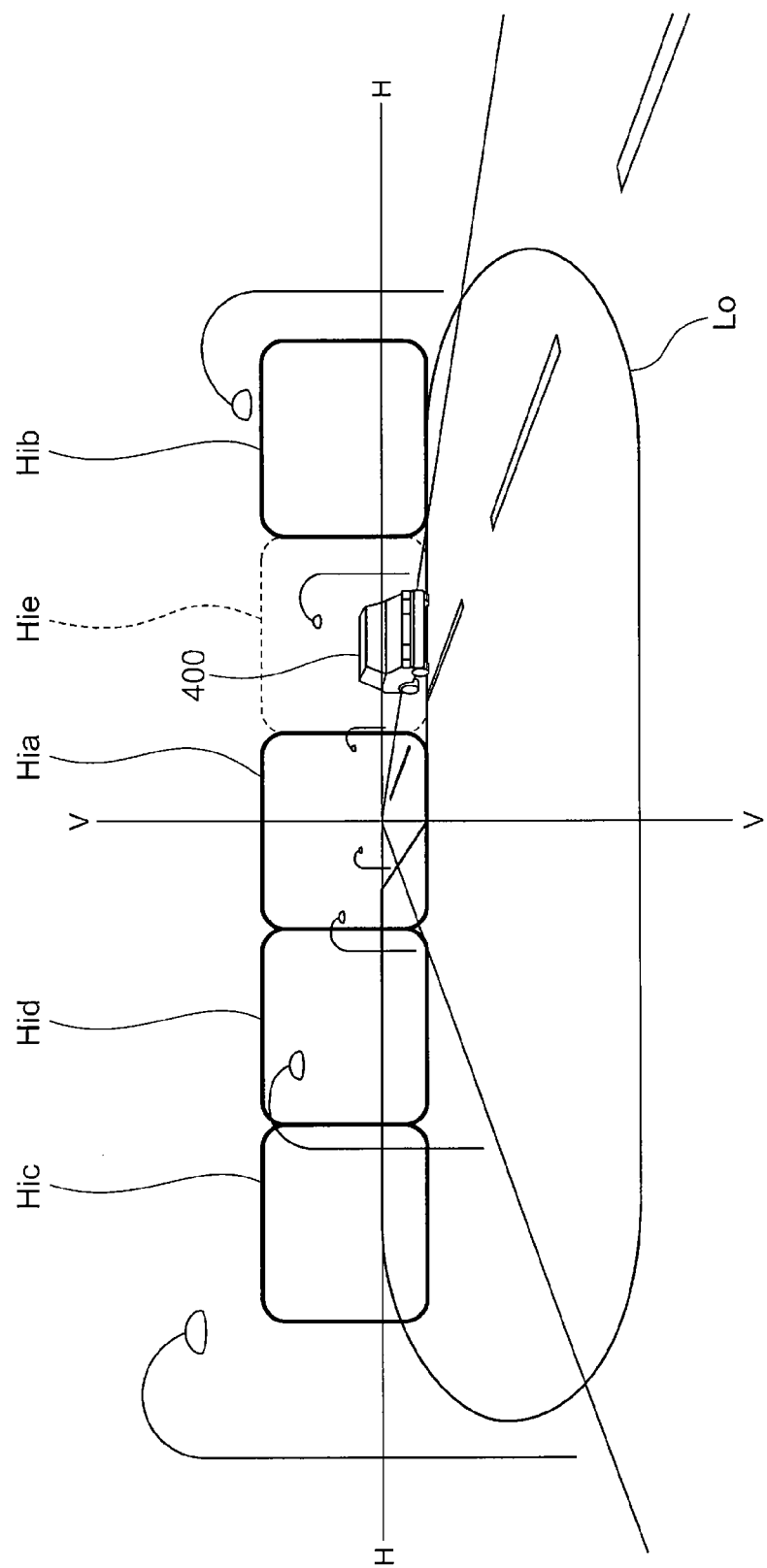
FIG. 5 is a view for illustrating a light distribution pattern when a forward vehicle has been detected.
Figure 6A:
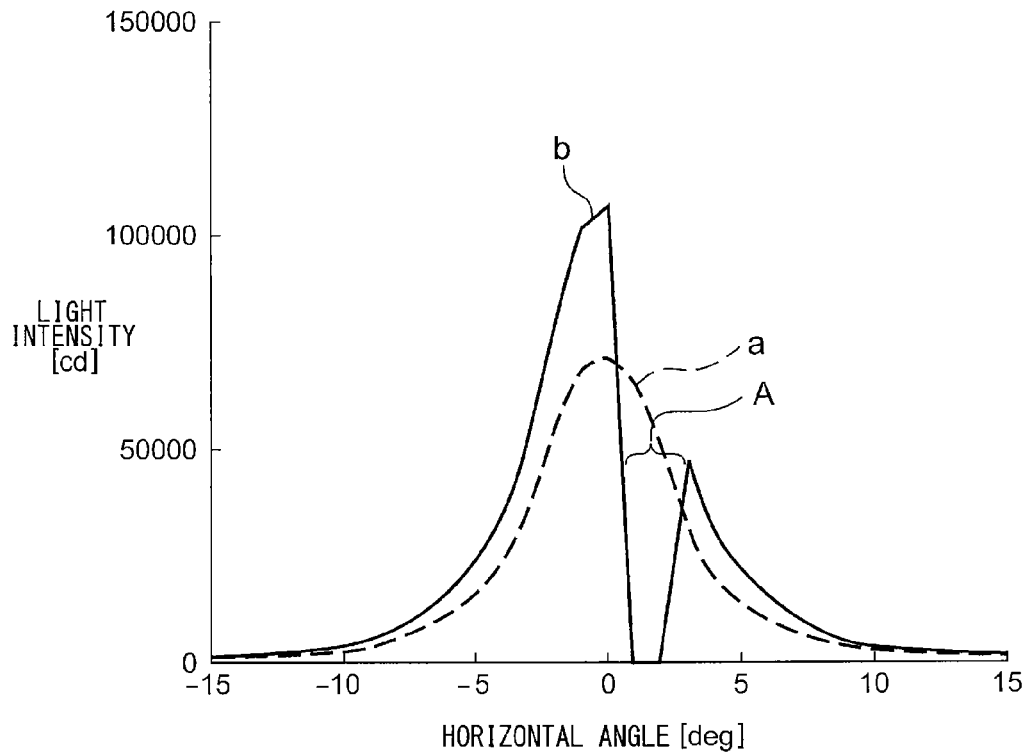
FIGS. 6A and 6B are graphs illustrating changes in the light intensity in the horizontal direction of a lamp unit forming an additional light distribution pattern.
Figure 6B:
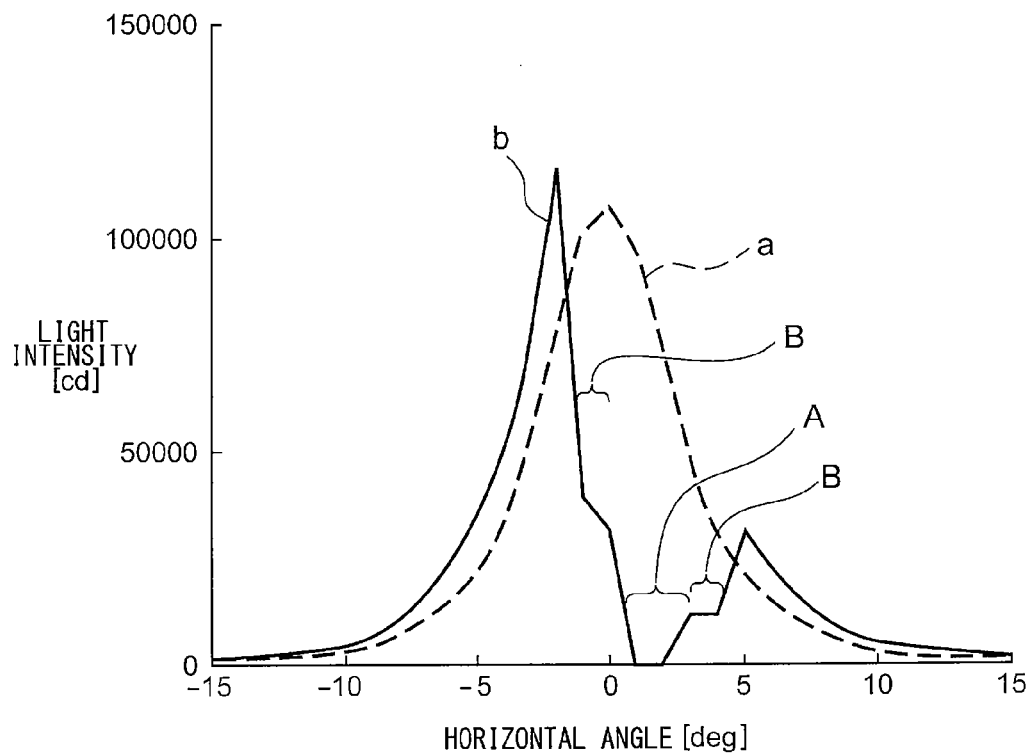

Subsequently, an example of formation control of light distribution patterns by the automotive headlamp apparatus 200 according to the present embodiment, the automotive headlamp apparatus 200 being provided with the aforementioned structures, will be described. FIG. 5 is a view for illustrating a light distribution pattern when a forward vehicle has been detected. FIGS. 6A and 6B are graphs illustrating changes in the light intensity in the horizontal direction of a lamp unit forming an additional light distribution pattern. In FIGS. 6A and 6B, the dashed line a represents a light intensity when a forward vehicle is not present and the solid line b represents a light intensity when a forward vehicle is present. FIGS. 6A and 6B illustrate changes in the light intensity when the lamp units 10a to 10e are collectively considered as a single lamp unit. It is noted that, because the view of FIG. 5 is schematically illustrated, the horizontal angle of each individual pattern illustrated in FIG. 5 and that illustrated in FIGS. 6A and 6B do not always match each other.

In the automotive headlamp apparatus 200 according to the present embodiment, the light distribution pattern for high beam Hi, which is an additional light distribution pattern, is divided into a plurality of individual patterns Hia to Hie. The emission controllers 228L and 228R form the light distribution pattern for high-beam Hi and also perform an ADB mode in which the illuminance of each of the individual patterns Hia to Hie is adjusted in accordance with presence of a forward vehicle. The emission controllers 228L and 228R reduce the illuminance of the individual pattern overlapping an area where a forward vehicle is present and increase the illuminance of at least one of other individual patterns, in the ADB mode. An additional light distribution pattern is one including the upper area above the cut-off line of a light distribution pattern for low beam.

Specifically, when the high beam is ordered through an operation of the light switch 304 by a driver, the emission controllers 228L and 228R perform high beam light emission by the light distribution pattern for low beam Lo and that for high beam Hi after turning on the lamp units 30 and 10. In contrast, when the low beam is ordered by a driver, the emission controllers 228L and 228R perform low beam light emission by the light distribution pattern for low beam Lo after turning on the lamp unit 30.

In addition, when a non-illustrated ADB mode switch of which, for example, part of the light switch 304 is composed is turned on, the emission controllers 228L and 228R perform the ADB mode in accordance with an order of the vehicle controller 302. In the ADB mode, the emission controllers 228L and 228R form the light distribution pattern for low beam Lo and each of the individual patterns Hia to Hie. When the presence of a forward vehicle 400 has been detected as illustrated in FIG. 5, the emission controllers 228L and 228R reduce the illuminance of the individual pattern Hie overlapping an area where the forward vehicle 400 is present and increase the illuminance of the individual patterns Hia, Hib, Hic, and Hid, which do not overlap the area where the forward vehicle is present. That is, the two emission controllers reduce the light intensity of the lamp unit 10e emitting light to an area A where a forward vehicle is present, and increase the light intensity of each of the lamp units 10a to 10d, which emit light to other areas, as illustrated in FIG. 6A.

Thus, by reducing the illuminance of the individual pattern overlapping an area where a forward vehicle 400 is present and by illuminating, of other individual patterns, areas where the forward vehicle 400 is not present, glare to a forward vehicle can be prevented and simultaneously the visibility of a driver in other areas can be enhanced. Further, by increasing the illuminance of the other individual patterns, suppression of an effect of enhancing the visibility of a driver, the effect being obtained by emitting light to other areas, can be avoided. Accordingly, the visibility of a driver in the areas can be further enhanced. It is noted that the information on the range with respect to an area where each of the individual patterns Hia to Hie is present is beforehand stored in the emission controllers 228L and 228R, and hence the emission controllers 228L and 228R can determine the individual pattern overlapping an area where a forward vehicle 400 is present, with reference to the information on the range.

The emission controllers 228L and 228R may reduce, of other individual patterns not overlapping an area where a forward vehicle 400 is present, the illuminance of the individual pattern adjacent to the individual pattern overlapping an area where a forward vehicle 400 is present. For example, in FIG. 5, the illuminance of each of the individual patterns Hia and Hib, which are adjacent to the individual pattern Hie overlapping an area where a forward vehicle 400 is present, is reduced. Thereby, even when a situation occurs in which formation control of an additional light distribution pattern is too late, for example, for the movement of a forward vehicle 400, the fear of providing glare to the forward vehicle 400 can be reduced. In this case, it is desirable to reduce the illuminance of each of the individual patterns Hia and Hib so as to be lower than that of the light distribution pattern for high beam Hi formed when a forward vehicle is not present and to be higher than that of the individual pattern Hie overlapping an area where a forward vehicle is present. That is, as illustrated in FIG. 6B, the light intensity of the lamp unit 10e emitting light to an area A where a forward vehicle is present is reduced, and the light intensity of each of the lamp units 10a and 10b, which emit light to the area B adjacent to the area A, is made higher than that of the area A and lower than that occurring when a forward vehicle is not present. Thereby, the visibility of a driver can be enhanced to some extent while reducing the possibility of providing glare to a forward vehicle.

Figure 7:
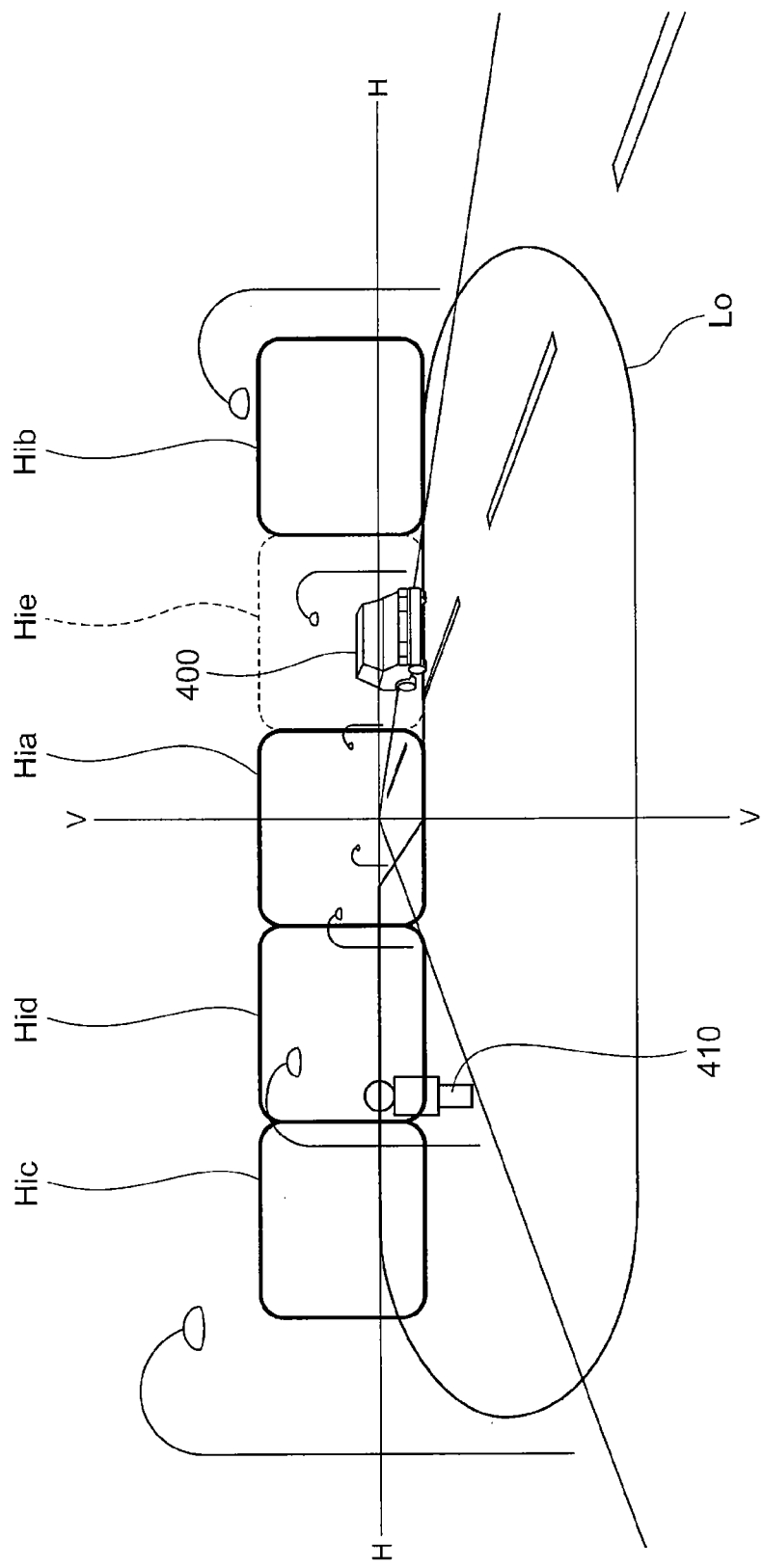
FIG. 7 is a view for illustrating a light distribution pattern when a forward vehicle and an obstacle have been detected.

In addition, when an obstacle has been detected in front of the driver's vehicle by an obstacle detection apparatus composed of, for example, the vehicle controller 302 and the camera 306, the emission controllers 228L and 228R may increase the illuminance of other individual patterns not overlapping an area where a forward vehicle is present. FIG. 7 is a view for illustrating a light distribution pattern when a forward vehicle and an obstacle have been detected. When, for example, a pedestrian 410 has been detected as an obstacle as illustrated in FIG. 7, the emission controllers 228L and 228R reduce the illuminance of the individual pattern Hie overlapping the forward vehicle 400 and increase the illuminance of each of the other individual patterns Hia, Hib, Hic, and Hid. In the case where an obstacle is not present, it is generally less required for the visibility of a driver in an area where a forward vehicle is not present to be enhanced, when compared with the case where an obstacle is present. Then, it is made to increase the illuminance of other individual patterns only when an obstacle has been detected. Thereby, an increase in the electrical power consumption can be suppressed while enhancing the visibility of a driver. Alternatively, in this case, only the illuminance of the individual pattern overlapping an area where a detected obstacle is present may be increased. Thereby, the electrical power consumption can be further reduced.

In the case where the control of reducing the illuminance of the individual pattern adjacent to the individual pattern overlapping an area where a forward vehicle is present is performed in conjunction with the control of increasing the illuminance of the individual pattern overlapping an area where an obstacle is present when the obstacle has been detected, and if the adjacent individual pattern and the individual pattern overlapping the area where an obstacle is present are overlapped with each other, either increase or reduction in the illuminance of the individual pattern can be appropriately selected in accordance with the preference of either the prevention of glare to be provided to a forward vehicle or the enhancement of the visibility of a driver.

Figure 8:
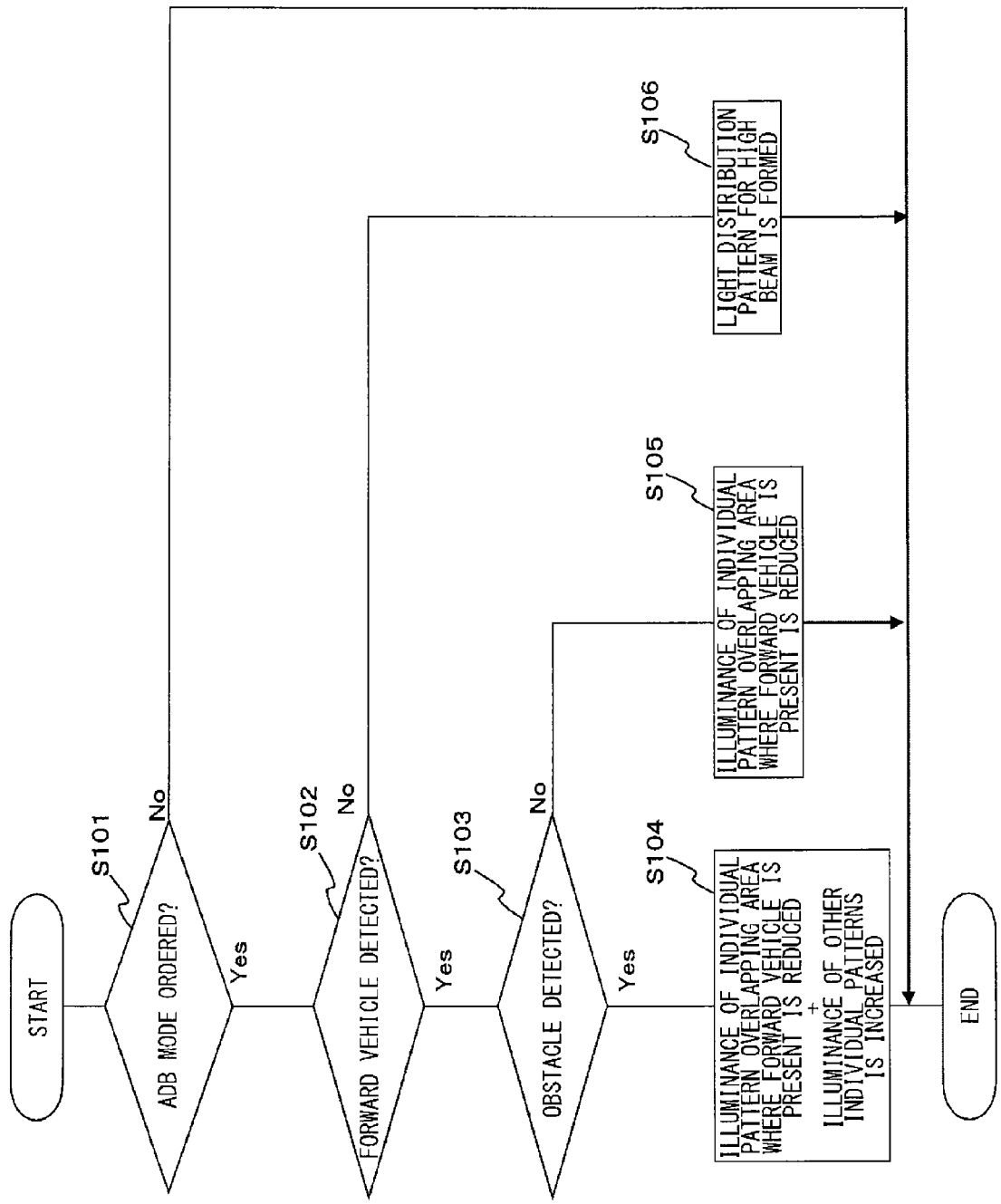
FIG. 8 is a flowchart for controlling formation of light distribution patterns in an automotive headlamp apparatus according to Embodiment 1.

FIG. 8 is a flowchart for controlling formation of light distribution patterns in an automotive headlamp apparatus according to Embodiment 1. The flow is repeatedly performed by the emission controllers 228L and 228R at a predetermined timing. It is noted that this flowchart is used for the case including the control for increasing the illuminance of other individual patterns when an obstacle has been detected.

The emission controllers 228L and 228R at first determine whether an order of executing the ADB mode has been made based on the information obtained from the vehicle controller 302 (step 101: hereinafter, simply referred to as S101. The same is true with other steps). When an order of executing the ADB mode has not been made (S101/No), the routine will be ended. When an order of executing an ADB mode has been made (S101/Yes), the emission controllers perform the ADB mode to determine whether a forward vehicle has been detected (S102).

When a forward vehicle has been detected (S102/Yes), the emission controllers 228L and 228R determine whether an obstacle has been detected (S103). When an obstacle has been detected (S103/Yes), the emission controllers 228L and 228R reduce the illuminance of the individual pattern overlapping an area where a forward vehicle is present and increase the illuminance of other individual patterns (S104), thereafter ending the routine. When an obstacle has not been detected (S103/No), the emission controllers 228L and 228R reduce the illuminance of the individual pattern overlapping an area where a forward vehicle is present (S105), thereafter ending the routine. When a forward vehicle has not been detected (S102/No), the emission controllers 228L and 228R form the light distribution pattern for high beam Hi including all of the individual patterns Hia to Hie (S106), thereafter ending the routine.

Operations and operation effects due to the aforementioned structure will be summarized. In the automotive headlamp apparatus 200 according to the present embodiment, the emission controllers 228L and 228R performs an ADB mode in which formation of a plurality of individual patterns by which additional light distribution patterns are composed is controlled in accordance with presence of a forward vehicle. When a forward vehicle has been detected in the ADB mode, the emission controllers 228L and 228R reduces the illuminance of the individual pattern overlapping an area where a forward vehicle is present and increase the illuminance of at least one of other individual patterns. Thereby, glare to a forward vehicle can be prevented, and simultaneously the visibility of a driver in an area where a forward vehicle is not present can be further enhanced.

In the aforementioned control, the emission controllers 228L and 228R can reduce, of the other individual patterns, the illuminance of the individual pattern adjacent to the individual pattern overlapping an area where a forward vehicle is present. Thereby, although the visibility of a driver in an area where a forward vehicle is not present is slightly suppressed, the possibility of providing glare to a forward vehicle can be further reduced. In addition, it may be designed that, when an obstacle has been detected, the emission controllers 228L and 228R increase the illuminance of other individual patterns. Thereby, an increase in the electrical power consumption can be suppressed.

(Embodiment 2)

An automotive headlamp apparatus according to Embodiment 2 performs the control in which the illuminance of the individual pattern overlapping an area where high visibility is demanded, the area being determined in accordance with the driving road of the driver's vehicle, of the individual patterns overlapping an area where a forward vehicle is not present. Hereinafter, the present embodiment will be described. Because the major structure of an automotive headlamp apparatus and the shapes of light distribution patterns that can be formed, etc., are similar to those in Embodiment 1, similar structures to those in Embodiment 1 will be denoted with the same reference numerals and the descriptions and illustrations with respect to them will be appropriately omitted.

Figure 9:
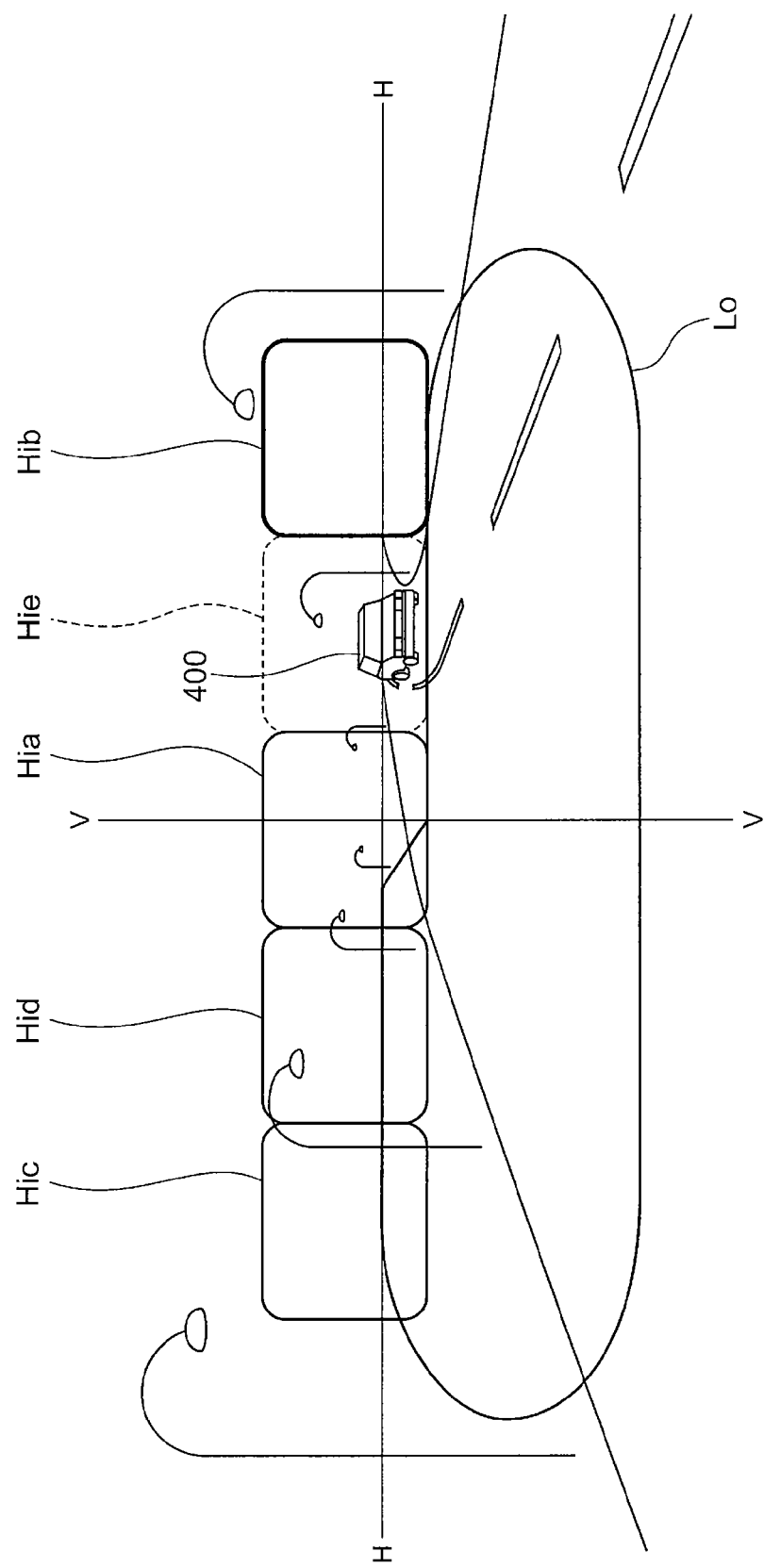
FIG. 9 is a view for illustrating a light distribution pattern in an automotive headlamp apparatus according to Embodiment 2, when a forward vehicle has been detected.

FIG. 9 is a view for illustrating a light distribution pattern in an automotive headlamp apparatus according to Embodiment 2, when a forward vehicle has been detected. In an automotive headlamp apparatus 200 according to the present embodiment, a light distribution pattern for high beam Hi, which is an additional light distribution pattern, is divided into a plurality of individual patterns Hia to Hie. In the ADB mode, emission controllers 228L and 228L reduce the illuminance of the individual pattern overlapping an area where a forward vehicle is present and increase the illuminance of at least one of other individual patterns.

In the present embodiment, the emission controllers 228L and 228R increase, of other individual patterns, the illuminance of the individual pattern overlapping an area where high visibility is demanded, the area being determined in accordance with the driving road of the driver's vehicle. Specifically, when the driving road of the driver's vehicle is a curved road as illustrated in FIG. 9, the emission controllers 228L and 228R reduce the illuminance of the individual pattern Hie overlapping an area where a forward vehicle 400 is present. In addition, the emission controllers 228L and 228R determine that, on a curved road, the exit area of the curved road is an area where high visibility is demanded such that the illuminance of the individual pattern Hib overlapping an exit area of a curved road is increased. Herein, an area where high visibility is demanded is determined in accordance with the shape of a road, and when a driving road is, for example, an urban road, an area where high visibility is demanded is a road shoulder area of the road. The emission controllers 228L and 228R can determine the shape and the type of a driving road based on the information obtained from a camera 306, a steering sensor 310, and a navigation system 314. In the emission controllers 228L and 228R, the information on an area where high visibility is demanded, the area being determined in accordance with a driving road, is registered beforehand, and hence an area where high visibility is demanded can be specified with reference to the information. In each of the other individual patterns Hia, Hic, and Hid excluding the individual pattern Hib overlapping an area where high visibility is demanded, a formation state with the initial illuminance is maintained. Herein, the "initial illuminance" means the illuminance of a light distribution pattern for high beam Hi, which is usually formed in a state where a forward vehicle is not present.

As stated above, by reducing the illuminance of the individual pattern overlapping a forward vehicle 400 and by increasing the illuminance of the individual pattern overlapping an area where high visibility is demanded, the visibility of a driver in an area where high visibility is demanded can be enhanced while preventing glare to the forward vehicle 400, and also the electrical power consumption can be reduced.

It may be made for the emission controllers 228L and 228R to reduce, of the other individual patterns, the illuminance of the individual patterns excluding the individual pattern overlapping an area where high visibility is demanded. For example, in the state illustrated in FIG. 9, the illuminance of each of the individual patterns Hia, Hic, and Hid is reduced. In this case, it is desirable for the illuminance of each of these individual patterns to be reduced so as to be lower than that of a light distribution pattern for high beam Hi formed when a forward vehicle is not present and to be higher than that of the individual pattern Hie overlapping an area where a forward vehicle is present. Thereby, the visibility of a driver in an area where high visibility is demanded can be enhanced and also the electrical power consumption can be reduced. Further, the visibility of a driver in other area excluding areas where a forward vehicle is present and where high visibility is demanded can be enhanced to some extent.

In the case where the control of reducing the illuminance of the individual pattern adjacent to the individual pattern overlapping an area where a forward vehicle is present, the control being described in Embodiment 1, and the control of increasing the illuminance of the individual pattern overlapping an area where high visibility is demanded, are performed in conjunction with each other, and when the adjacent individual pattern and the individual pattern overlapping an area where high visibility is demanded are overlapped with each other, either increase or reduction in the illuminance of the individual pattern can be appropriately selected in accordance with the preference of either the prevention of glare to be provided to a forward vehicle or the enhancement of the visibility of a driver.

Figure 10:
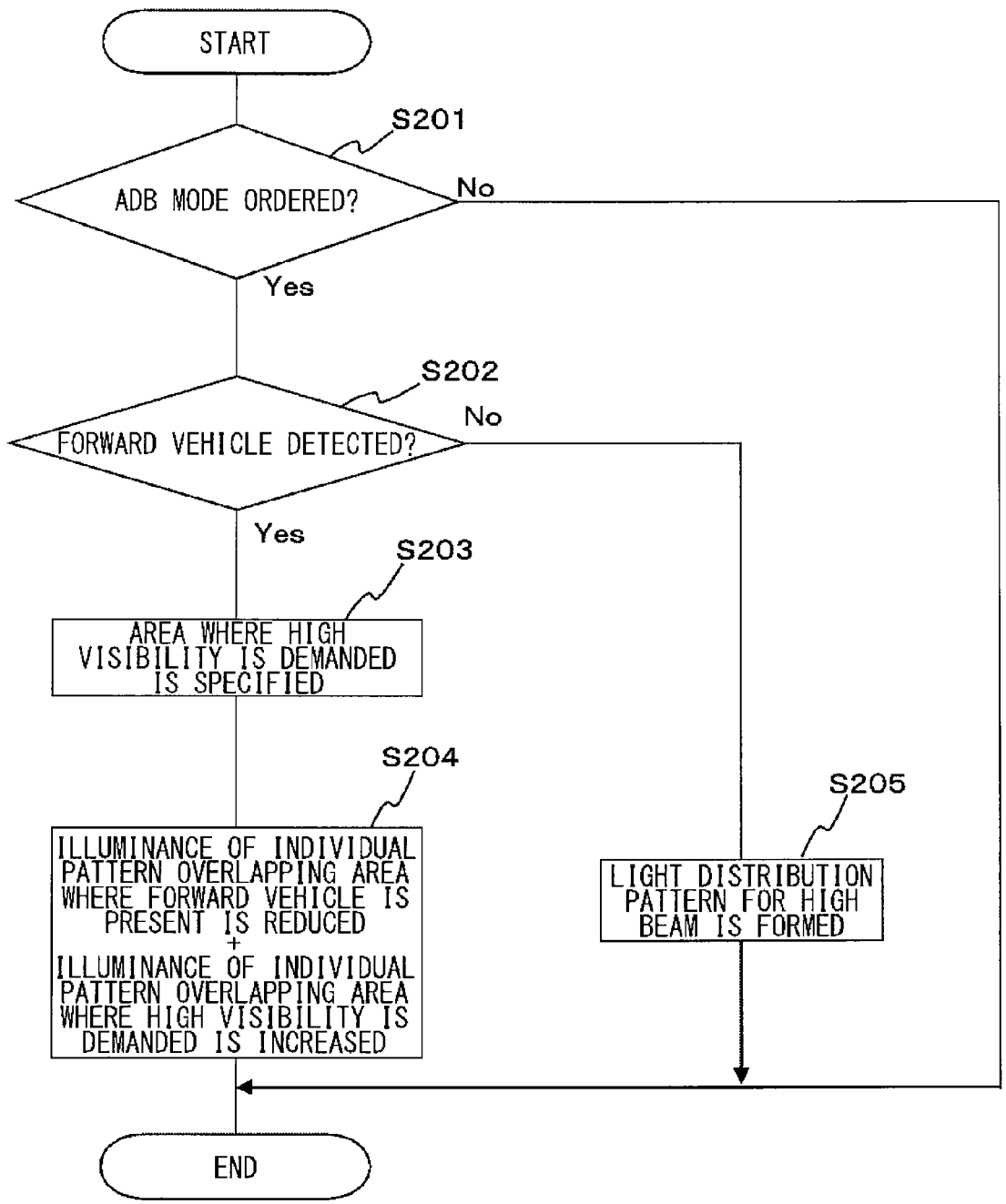
FIG. 10 is a flowchart for controlling formation of light distribution patterns in the automotive headlamp apparatus according to Embodiment 2.

FIG. 10 is a flowchart for controlling formation a light distribution pattern in the automotive headlamp apparatus according to Embodiment 2. This flow is repeatedly performed by the emission controllers 228L and 228R at a predetermined timing.

The emission controllers 228L and 228R at first determine whether an order of executing the ADB mode has been made based on the information obtained from a vehicle controller 302 (S201). When an order of executing the ADB mode has not been made (S201/No), the routine will be ended. When an order of executing the ADB mode has been made (S201/Yes), the emission controllers 228L and 228R perform the ADB mode to determine whether a forward vehicle has been detected (S202).

When a forward vehicle has been detected (S202/Yes), the emission controllers 228L and 228R specify an area where high visibility is demanded on a driving road of the driver's vehicle (S203). Then, the emission controllers 228L and 228R reduce the illuminance of the individual pattern overlapping an area where a forward vehicle is present, and also increase, of the other individual patterns, the illuminance of the individual pattern overlapping an area where high visibility is demanded (S204), thereafter ending the routine. When a forward vehicle has not been detected (S202/No), the emission controllers 228L and 228R form a light distribution pattern for high beam Hi including all of the individual patterns Hia to Hie (S205), thereafter ending the routine.

As stated above, when a forward vehicle has been detected in the ADB mode in the present embodiment, the illuminance of the individual pattern overlapping an area where a forward vehicle is present is reduced and also, of other individual patterns, the illuminance of the individual pattern overlapping an area where high visibility is demanded is increased. Thereby, glare to a forward vehicle can be prevented and also the visibility of a driver in an area where high visibility is demanded, of the areas where a forward vehicle is not present, can be further enhanced. Further, because, of other individual patterns, the illuminance of each of the individual patterns excluding the individual pattern overlapping an area where high visibility is demanded, is not increased, an increase in the electrical power consumption can be suppressed. Further, when the illuminance of each of these individual patterns is reduced, an increase in the electrical power consumption can be further suppressed.

The present invention should not be limited to the aforementioned embodiments, and any appropriate combination of each component of the embodiments and various modifications such as design alterations based on the knowledge of those skilled in the art can be made. Such combined or modified embodiments would also fall within the scope of the present invention. New embodiments created by combining the aforementioned embodiments with each other and by combining each of the aforementioned embodiments and each of the following variations would have both effects of the embodiments and the variations to be combined.

For example, although the automotive headlamp apparatus 200 according to each of the aforementioned embodiments has a structure in which the lamp units 10a to 10e, respectively corresponding to each of the individual patterns Hia to Hie, are provided, the structure of the lamp unit should not be limited thereto. For example, the automotive headlamp apparatus 200 may have a structure in which the automotive headlamp apparatus is provided with a lamp unit including a light source in which a plurality of LEDs are arranged in a matrix shape and each of the individual patterns Hia to Hie is formed by individually controlling each of the outputs of the plurality of LEDs. Alternatively, the automotive headlamp apparatus may have a structure in which the light from a light source is reflected by a DVD (Digital Mirror Device) to enter a projection lens by arranging the light source and the projection lens such that both light axes of them intersect with each other and by arranging the DVD, in which a plurality of micromirrors are arranged in a matrix shape, at the intersection points of both light axes, so that each of the individual patterns Hia to Hie is formed by individually switching the angle of each micro mirror of the DVD. Alternatively, the automotive headlamp apparatus may have a structure in which each of the individual patterns Hia to Hie is formed by scanning the spot light of a light source, with a light source and a projection lens being arranged such that both light axes of them intersect with each other, and with a small-sized mirror capable of being driven at high speed being arranged at the intersection points of both light axes.

In each of the aforementioned embodiments, although the emission controllers 228L and 228R determine an individual pattern and an area where high visibility is demanded, etc., which overlap a state or an area, etc., where a forward vehicle is present, it may be made for the vehicle controller 302 to perform these determination. In this case, the emission controllers 228L and 228R control turning on/off of the bulb 14, etc., based on an order from the vehicle controller 302.

What is claimed is:

1. An automotive headlamp apparatus comprising: a lamp unit configured to be capable of forming an additional light distribution pattern that includes an upper area above the cut-off line of a light distribution pattern for low beam and that is divided into a plurality of individual patterns; and a controller configured to control formation of each of the individual patterns in accordance with presence of a forward vehicle, wherein the controller reduces the illuminance, of an individual pattern overlapping an area where a forward vehicle is present, from an initial illuminance of the individual pattern formed in a state where a forward vehicle is not present, and increases the illuminance of at least one of other individual patterns from the initial illuminance regardless of the presence or absence of an obstacle in front of the vehicle detected by an obstacle detection apparatus or of an area where high visibility is demanded as determined in accordance with the driving road of the driver's vehicle.

2. The automotive headlamp apparatus according to claim 1, wherein, when an obstacle has been detected in front of the vehicle by an obstacle detection apparatus, the controller increases the illuminance of at least one of the other individual patterns overlapping an area where the obstacle is present.

3. The automotive headlamp apparatus according to claim 1, wherein the controller increases, of the other individual patterns, the illuminance of an individual pattern overlapping an area where high visibility is demanded, the area being determined in accordance with a driving road of the driver's vehicle.

4. The automotive headlamp apparatus according to claim 3, wherein, when the driving road is an urban road, the area where high visibility is demanded is a road shoulder area of the road.

5. The automotive headlamp apparatus according to claim 3, wherein, when the driving road is a curved road, the area where high visibility is demanded is an exit area of the curved road.

6. The automotive headlamp apparatus according to claim 1, wherein the controller reduces, of the other individual patterns, the illuminance of the individual pattern adjacent to the individual pattern overlapping an area where a forward vehicle is present.

7. The automotive headlamp apparatus according to claim 3, wherein the controller reduces, of the other individual patterns, the illuminance of individual patterns excluding the individual pattern overlapping an area where high visibility is demanded.

8. The automotive headlamp apparatus according to claim 2, wherein the obstacle is a pedestrian.

9. The automotive headlamp apparatus according to claim 6, wherein the controller makes the illuminance of the adjacent individual pattern higher than that of the individual pattern overlapping an area where a forward vehicle is present.

10. A control apparatus for a lamp unit configured to be capable of forming an additional light distribution pattern that includes an upper area above the cut-off line of a light distribution pattern for low beam and that is divided into a plurality of individual patterns, wherein the control apparatus is configured to output a control signal that reduces the illuminance, of an individual pattern overlapping an area where a forward vehicle is present, from an initial illuminance of the individual pattern formed in a state where a forward vehicle is not present, and that increases the illuminance of at least one of other individual patterns from the initial illuminance regardless of the presence or absence of an obstacle in front of the vehicle detected by an obstacle detection apparatus or of an area where high visibility is demanded as determined in accordance with the driving road of the driver's vehicle.

11. A lamp unit configured to be capable of forming an additional light distribution pattern that includes an upper area above the cut-off line of a light distribution pattern for low beam and that is divided into a plurality of individual patterns, and also configured to reduce the illuminance, of an individual pattern overlapping an area where a forward vehicle is present, from an initial illuminance of the individual pattern formed in a state where a forward vehicle is not present, and to increase the illuminance of at least one of other individual patterns from the initial illuminance regardless of the presence or absence of an obstacle in front of the vehicle detected by an obstacle detection apparatus or of an area where high visibility is demanded as determined in accordance with the driving road of the driver's vehicle.

* * * * *